United States Patent [19]

Szabo

[11] E Re. 29,864

[45] Reissued Dec. 19, 1978

[54] METHOD OF AND APPARATUS FOR MULTI-GALLEY COMPOSITION

[75] Inventor: Francis S. Szabo, Morristown, N.J.

[73] Assignee: Addressograph-Multigraph Corporation, Los Angeles, Calif.

[21] Appl. No.: 667,850

[22] Filed: Mar. 17, 1976

Related U.S. Patent Documents

Reissue of:

[64] Patent No.: 3,905,699
Issued: Sep. 16, 1975
Appl. No.: 482,849
Filed: Jun. 25, 1974

[51] Int. Cl.[2] ..... G03B 27/52

[52] U.S. Cl. ..... 355/41; 355/54; 355/77

[58] Field of Search ..... 355/41, 40, 53, 54, 355/77; 271/226; 354/5, 7, 11

[56] References Cited

U.S. PATENT DOCUMENTS

| | | | |
|---|---|---|---|
| 3,564,209 | 2/1971 | Loughnane | 355/41 X |
| 3,813,159 | 5/1974 | Schlegel, Jr. | 355/41 |
| 3,874,791 | 4/1975 | Thieme et al. | 355/41 |

*Primary Examiner*—Richard A. Wintercorn
*Attorney, Agent, or Firm*—Ray S. Pyle; Robert S. Hulse

[57] ABSTRACT

In a photocomposition machine environment the apparatus and method show the concept of advancing the photosensitive material into position normally occupied for composition of text. The known apparatus and method are then modified by providing reverse leading for the paper and re-advance to the starting point followed by composition of a second column lateral to and aligned with the first column. A particular advance in the art is the ability to compose a complex mathematical formula with greatly simplified software using the improved hardware.

The point of reference is established by a sensor which is activated upon advance of the paper to the sensor and therefore reversal and re-advancement of the paper will cause an exact repositioning of the paper for each column.

9 Claims, 4 Drawing Figures

METHOD OF AND APPARATUS FOR MULTI-GALLEY COMPOSITION

Matter enclosed in heavy brackets [ ] appears in the original patent but forms no part of this reissue specification; matter printed in italics indicates the additions made by reissue.

*This application is a reissue of U.S. Pat. No. 3,905,699, filed June 25, 1974 and issued Sept. 16, 1975.*

BACKGROUND OF THE INVENTION

In the printing art, type was composed in a galley and a galley proof printed for inspection. Changes in composition, spacing, or other improvements could then be accomplished prior to transferring the set type to the press.

Various means for making use of hand-set type have been developed, and machines were perfected for casting lead in response to an operator actuated keyboard.

With the advent of modern lithographic printing equipment, the photographic process became the means for producing a printing master for large-scale printing, and a direct impression master typed on an office typewriter became the common vehicle for less sophisticated but more rapid composition.

The VariTyper brand strike-on cold type machine was developed to provide typed source material but with the lines justified in the manner of set type. This "cold type" is then produced as lithographic masters by photographic techniques.

A more recent development is the photocomposition technique. A source of font, usually a revolving disc of characters in a photographic negative format, is projected within a light-tight environment upon photosensitive high-speed paper.

The photocomposing machine is capable of projecting columns of any width from one word up to the maximum width of the paper. Maximum width is established by the practical optics which can project from the revolving disc, or the practical distance that the disc can be transported within the housing.

However, not always is a column of the maximum width desired. Therefore, the composer very often will produce long narrow columns and waste the balance of the paper. Then, the column is physically cut into proper useful length and pasted onto a backing sheet in order to produce a multi-column galley.

In order to assure optically pleasing alignment, a rule is used to establish the second and further columns in alignment with the first column when such paste-up technique is used.

Mathematical formulas are a very difficult composition problem in known photocomposition machines.

There are three teaching examples given: (1) A strike-on typing machine; (2) A known photocomposer; and finally, an example (3) using the new structure of this invention. Note that in each example the instructions leave space for the unique symbols such as the integration sign $\int$. These symbols must be by some other means, such as hand artistry, or transfer lettering unless a specific symbol matrix and large print capability is available.

EXAMPLE 1

An actual composition problem is set forth below which has been set for a printed publication using a strike-on typing machine, and transfer letters of the type carried on a release backing and rubbed through the paper to cause transfer. This latter portion is for complex Greek letter forms. There are a total of 51 specific instructions to the typist for composing this entire formula. However, in order to simplify the illustration, only the first 13 instructions dealing with the first line of the formulas are set forth below the formula. The balance of the formula requires the balance of instructions 14 through 51 and is similar in nature to those reproduced:

$$R' = \frac{\sum_{p=0}^{N-1} \& \{|c(p)|^2\}}{\sum_{p=0}^{N-1} \& \{|i(s)|^2\}} = \sigma_i^2(m-1) + \sigma_q^2\sigma^2 + C_k(m+2)\,du\,d\tau$$

$$\left[|F(p)|^2 + \sum_{k=0}^{n-2} C_k 2^{-m+1+k} \sum_{i_{k+1}=0}^{1} \cdots \sum_{i_{m-1}=0}^{1} |F(I_{k,p})|^2\right]$$

$$= \left[Q_1\left(\frac{\delta}{\delta z'}\ \frac{\delta}{\delta e'}\right)\frac{1}{2\pi j}\int_{\alpha_0-j\infty}^{\alpha_0+j\infty} \frac{Ix(\gamma_1 p_0)}{Q_1(\gamma_1 p_0)} e^{\gamma z} \int_{t}^{p} d\gamma\right] F_{ie}e^{\mu}e' \quad (13)$$

1. From the last line of text, lead 44 points to baseline of the first equation.
2. Reverse lead 26 points (after setting R' =) and set the top limit of the summation.
3. Backspace to the first character of the top limit.
4. Lead down 19 points, set the bottom limit (which should be centered on the summation).
5. Reverse lead 10 points, set the balance of the numerator of the fraction.
6. Backspace to the beginning of the fraction.
7. Lead down 24 points to set the top limit of the summation in the denominator.
8. Backspace to the first character of the limit.
9. Lead down 19 points to the bottom limit of the summation; center limit on the summation.
10. Reverse lead 10 points and set the balance of the denominator.
11. Backspace to the beginning of the fraction.
12. Reverse lead 16 points to baseline and type the fraction bar.
13. Type the balance of the first line of the equation-reverse lead 4 points for superscripts, lead down 2 points for subscripts.

The author of the work in which the above formula appears stated that a computer program is impractical for the typical compositor in that program and the computer can never be made as versatile as a human operator except possibly at a very unrealistically high price.

Consequently, the compositor indicated that he prefers to have human operators set this work.

Notice the number of times the operator must lead backward and forward in order to set the complex formula. It can then be envisioned how difficult the problem would be if the compositor did attempt to write a software program for a photocomposing machine which did not have the capability of reverse leading of the type set forth hereinafter. In that case, the entire job would have to be composed from the top line down. Again, considering only the first line of the formula, if it were to be set on a phototypesetter without the reverse leading capability, the instruction would be substantially in this manner:

A word of explanation of the commands used appears to be in order. These commands appear in the text of this and the next instruction set. Their meaning is set forth in this glossary:

A. [No Flash]—The "no flash" command means that characters typed or entered following the command will result in spacing movement of the phototypesetter, but no actual imaging or flashing of the character. This function is used to provide the right amount of spacing or escapement when the actual widths of the characters in question are not known.

B. [Flash]—The "flash" command re-enables the normal flashing or exposure function in the phototypesetter. Characters entered following the flash command are exposed and cause character escapement.

C. [Return]—The "return" command has the same function as the carriage return key on a typewriter. It reinitializes the typesetting process back to its left hand margin on the left-hand-most edge of the present tab or indent.

D. [Zero Width]—The "zero width" command basically indicates that the single character following the command is to be flashed or exposed, but no character escapement takes place. If the command is given and two characters are then selected, the first character will be exposed with no width, meaning the typesetter will do no escapement or spacing. The second character is subsequently superimposed over the first. The second character spaces or escapes normally.

EXAMPLE 2

1. Set left margin at an indent value corresponding to the beginning of the first character in the equation.
2. Lead down 18 points.
3. Type [No Flash][R'=][Flash][N−1].
4. Lead down 5 points.
5. Type [No Flash][&{|e(p)][Flash][2][Return].
6. Lead down 4 points.
7. Type [No Flash][R=N−1][Flash][&{|e(p)][No Flash][2][Flash][}][Return].
8. Lead down 10 points.
9. Type [No Flash][R'=][Flash][p=o].
10. Lead down 3 points.
11. Type [No Flash][&{|e(p)|$^2$}=σ][Flash][2][No Flash][2(m−1) + σ][Flash][2][No Flash][σ][Flash][2][Return].
12. Lead down 4 points.
13. Type [R'=][No Flash][N-1 & {|e(p)$^2$}][Flash][σ][No Flash][2][Flash][2(m−1)+σ][No Flash][2][Flash][σ][No Flash][2][Flash][+C][No Flash][k][Flash][(m+2)dudτ][Return].
14. Lead down 2 points.
15. Type [No Flash][R'=N−1 &{|e(p)$^2$}=σ][Flash][Σ][No Flash][2(m−1)+σ][Flash][o][No Flash][σ][Flash][Σ][No Flash][+C][Flash][k][Return].
16. Lead down 5 points.
17. Type [No Flash][R'=][Flash][N−1].
18. Lead down 5 points.
19. Type [No Flash][&{|i(s)|][Flash][2][Return].
20. Lead down 4 points.
21. Type [No Flash][R'=N−1][Flash][*{|i(s)|][No Flash][2][Flash][}][Return].
22. Lead down 10 points.
23. Type [No Flash][R'=][Flash][p=o][Return].

Proceed with remainder of equation.

Reference to the Example 2 shows that a great deal of repetitive typing of characters for spacing alone is required, when the reverse leading capability is not present. Following the steps of Example 2 will show that it is rather confusing and requires a great deal of pre-planning in order to properly enter the characters starting with those set on the highest baselines.

In a similar manner, the instructions would be required in order to work through the remainder of the equation and are very complex. In fact, trial and error is probably necessary and the instructions will ordinarily require revision to get the proper spacing.

SUMMARY OF THE INVENTION

The advantage and object of this invention is to compose multiple columns upon the photosensitive paper in alignment with one another within the machine at one setting and thereby to avoid the necessity for cut and paste techniques.

Another object of the invention is to provide within the composition machine, a paper-handing system whereby the paper is advanced and retracted repeatedly to an exact starting place in order that successive column composition may be accomplished with each column in perfect alignment.

DESCRIPTION OF THE PREFERRED EMBODIMENT

Figure 1:
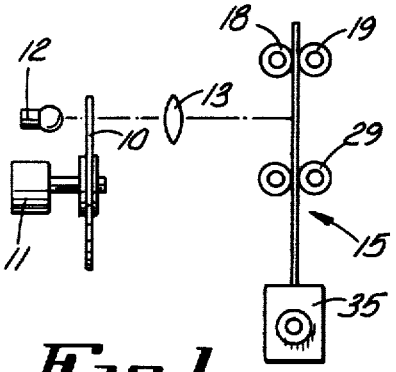
FIG. 1 is a schematic representation of a photocomposition system embodying the apparatus of this invention.
Figure 3:
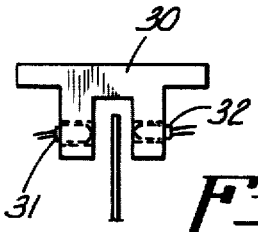
FIG. 3 is a top plan view of a paper sensing system according to this invention.

Photocomposition machines and processes are sufficiently well-known that the first figure of the drawing is set forth only in schematic arrangement and will properly illustrate the principles of the invention.

A photocomposition system is depicted by a disc 10 of conventional structure which bears a circular path of characters near the peripheral edge of the disc. The disc is rotated by a motor 11 at a uniform speed, related to the magnification ration of the image on the disc to the projected image to be reproduced.

A projection means is illustrated symbolically by a flash tube symbol 12 and a lens symbol 13. Such a photocomposing system and projecting means will entail the necessary transport and control systems which are well-known and therefore need not be set forth in detail.

This invention is embodied in a general photocomposition machine by a paper feed magazine 15. Although the magazine is set forth in schematic illustration in the drawing, one such magazine in wide use is illustrated in U.S. Pat. No. 3,724,945. The interior of composition machines is light-tight, because the photosensitive paper web used for the recording media is extremely sensitive, and a small portion thereof is exposed to the interior of the machine during the composition exposure. In the drawing herein, there is no attempt to show the details of the magazine construction such as illustrated in the referenced United States patent above.

In the magazine, a set of rolls 18 and 19 are used as a drive roll couple. They are in contact and one roll only is driven. The other roll is an idler.

A stepper motor 21 is employed as the power drive source for this paper feed roll set used for advancing a photosensitive sheet. The stepper motor drives the roll 18 by means of a pinion 22 carried by the motor shaft. [Pinion 22 operates a gear 23. Gear 23 drives a one-say clutch 24 which, in turn, drives the roll 18. One-way clutch 24 will permit advance drive only. If the motor 21 is reversed, the clutch 24 will not produce reverse drive force on the roll 18.]

[A gear 26 directly driven by gear 23 in turn is connected to drive a pinion 27. Pinion 27 operates through a spring friction slip clutch 28 to drive a reverse set of rolls 29.]

Figure 2:
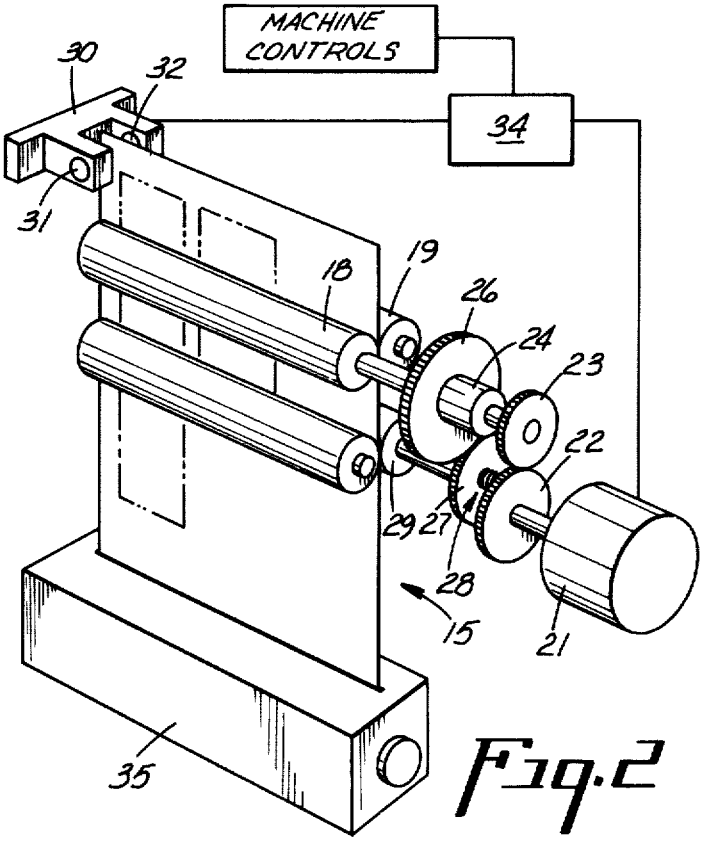
FIG. 2 is a perspective view of the paper-handling apparatus in schematic outline.

[Because of the arrangement of the pinions and gears, the set 29 is always urging a reverse drive of a web sheet passing through the magazine, but the spring friction clutch will allow a sheet driven by rolls 18 and 19 to advance against the reverse drive force. Such reverse drive assures a very tight, smooth section of paper web between the advance drive rolls and the reverse roll set 29. Threading of the paper web is accomplished by] *Gear 23 drives roll 18 up and down in steps determined by motor 21. Motor 21 steps to rotate pinion 22 clockwise, as viewed in FIG. 2, which turns roll 18 counterclockwise to drive the paper web in an advance direction.*

*A one-way clutch 24 is carried on the shaft of roll 18. The clutch is designed to impart drive force to pinion 26 only when motor 21 is reversed to drive roll 18 in a web retraction direction.*

Figure 4:
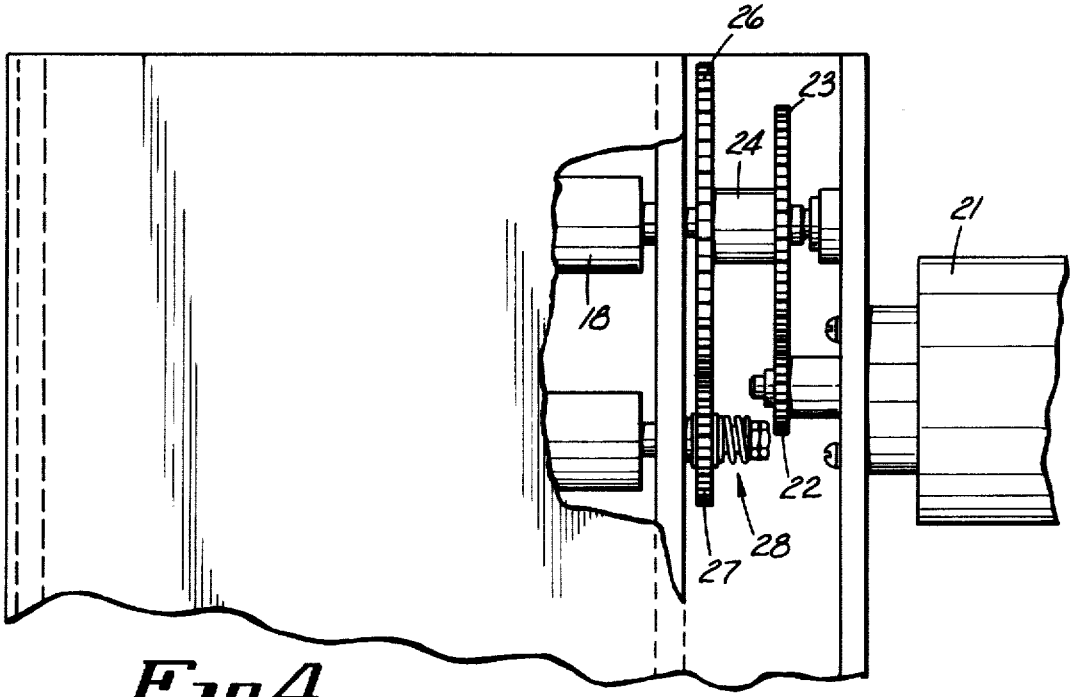
FIG. 4 is a side elevation of the apparatus of FIG. 2.

*Pinion 27 is journaled on the shaft of roll 29, and has a friction drive connection to the shaft through slip clutch 28. (See FIG. 4.)*

*In operation, with motor 21 in advance mode, roll 29, pinion 27, and pinion 26 turn freely under drive of the paper web, upon roll 29. This is an idle following.*

*When motor 21 is reversed to retract mode, clutch 24 will drive pinion 26 as well as roll 18. Because pinion 26 is larger than the pinion 27, there will be an urge to drive roll 29 at a feed rate greater than the reverse feed of roll 18. The slip clutch 28 will permit pinion 27 to turn at the greater speed and deliver rotational drive only to the degree permitted by roll 18. Therefore, precision matching of pinion gears is unnecessary.*

*Threading of the paper web is accomplished by* mounting the idler rolls on a pivot carriage to swing them aside during loading. See U.S. Pat. No. 3,724,945.

An edge sensor 30 is positioned along the side of the path established for the paper web sheet and is equipped with a light source 31 and a sensor 32 such that when the sheet advances to the edge sensor 30 a signal will be generated.

A controller 34 such as a PDP-8 manufactured by Digital Equipment Corporation, Maynard, Mass. is a computer, commonly referred to as a mini-computer because of the limited capacity thereof, and contains all controls for the entire photocomposing machine including the necessary control of disc 10, flash tube 12, and letter-by-letter and character-by-character placement of the image on the paper sheet bridging between the advance and retract rolls of the magazine.

The controller 34 also contains logic which will receive the signal generated by arrival of the paper sheet web at the edge sensor 30, and will cause the stepper motor to cease forward advance drive of roll 18. Then, the controller 34 will cause the photocomposing system to expose a series of characters in a line reestablished length on one portion of the paper bridging between the drive and retract roll sets. After composition of the first line, the controller 34 will cause the stepper motor to advance the drive rolls 18 and 19 a distance known as a leading distance whereafter a second line is composed. Line by line a column is thus composed for a given predetermined column length.

At this point this invention differs from standard practice in that [piror] *prior* standard practice has been to continue composing in a single column regardless of available paper web width, and thereafter to manually cut and paste the columns in lateral alignment for a finished gallery of multiple columns.

A mathematical formula represents a photocomposition problem of considerable programming difficulty in standard machines. This invention enables such composition with ease. One word, or even a letter or number may be treated as a column. The placement of the formula characters in correct leading relationship becomes attainable with ease.

According to this invention, the controller, at the end of column 1, will cause stepper motor 21 to reverse. Such reversal will not affect the drive roll 18 because of the one-way clutch 24, but the reversal will then allow the roll set 29 to reverse direction under the [crive] *drive* influence of the spring friction clutch 28 and reverse the paper back toward a raw film storage box 35. The construction of a normal paper feed magazine is such that there is sufficient room between the box 35 and the reverse roll set 29 to allow the paper to fold harmlessly until re-advanced.

The stepper motor is reversed a distance sufficiently to bring the top of the composed column well below the normal composing position, rather than to reverse just to a composing position. Forward advance will again pick up the slack that is in the drive gear construction and hence make possible a much less costly construction than would be required if precision gearing were specified without a backlash tolerance.

When the stepper motor is again advanced, it will proceed to drive the paper web sheet back to the edge sensor 30 and produce a signal when the paper edge reaches the sensor 30. The signal is recognized by the controller 34 and composition is then connected in a second column lateral to the first column and with the starting line in exact alignment with the first line of the first column composed.

It has been found that a series of holes or marks along the edge of the paper web also provides a useful means for control of positioned relationship, rather than the cut end. It is the use of a useful references feature, not any particular marker, that enables the proper leading and reverse leading.

EXAMPLE 3

1. Set left margin at an indent value corresponding to beginning of the first character in the equation.

2. Lead down 44 points. Set leading reference.
3. Type [$R^1$=].
4. Reverse leads 26 points from reference.
5. Type [N−1].
6. Lead down 9 points.
7. Type [&1e(p)1].
8. Reverse lead 21 points from reference (4 points).
9. Type [2].
10. Lead down 4 points.
11. Type [ ].
12. Lead down to reference (17 points).
13. Type [= ].
14. Reverse lead 4 points from reference.
15. Type [Zero width][2].
16. Lead down 6 points.
17. Type [E].
18. Reverse lead to reference.
19. Type [2(m−1)+].
20. Reverse lead 4 points from reference.
21. Type [Zero Width][2].
22. Lead down 6 points.
23. Type [o].
24. Reverse lead to reference.
25. Type [ ].
26. Reverse lead 4 points from reference.
27. Type [Zero Width][2].
28. Lead down 6 points.
29. Type [E].
30. Reverse lead to reference.
31. Type [+C].
32. Lead down 2 points.
33. Type [k].
34. Reverse lead to reference.
35. Type [(m+2)dud][Return].
36. Reverse lead 7 points from reference.
37. Type [No Flash][R′=][Flash][p=o][Return].
38. Lead down 14 points.
39. Type [No Flash][R′=][Flash][N−1].
40. Lead down 9 points.
41. Type [&li(s)1].
42. Reverse lead 4 points (or, reverse lead to reference, lead down 12 points).
43. Type [2].
44. Lead down 4 points.
45. Type [ ][Return].
46. Lead down 10 points.
47. Type [No Flash][R′=][Flash][p=o].

Proceed with remainder of equation.

Where reverse leading is present as in Example 3, characters can be entered in more nearly their normal sequence. Interspersed commands can move the baseline back and forth as required. The use of a reference baseline makes it convenient to work with respect to some central baseline from which all other dimensions can be determined. Since repetitive leading in forward or reverse directions may result in error accumulations, returning to a reference baseline will improve typographic quality and keep baseline deviations to a minimum.

What is claimed is:

1. A method of multi-column composition, comprising the steps of:

providing a means for detecting a reference feature of a paper sheet advancing along a path and for producing a control signal from such reference feature when detected;

providing a power-driven paper feed means for advancing a photosensitive sheet along said path;

advancing a sheet along said path until the reference feature thereof is detected by said means, and a control signal is generated;

applying said signal to stop said power-driven paper feed means;

composing characters to produce at least one character in a first column position;

thereafter reversing said paper feed to withdraw the paper to a position retracted from said means for detecting the desired reference feature; and re-advancing said sheet until another control signal is produced by said means for detecting the reference feature, and, finally, composing a second at least one character on the same page in a lateral position to the first character and in a predetermined relationship thereto by a relationship to said reference feature;

whereby a multiple column galley is obtained in registration from a common reference.

2. The method of claim 1, wherein said composition takes place in a first column of a multiple number of lines, followed by reverse leading and composition of a second column wherein said lines are aligned with those of the first column.

3. The method of claim 1, wherein said composition placement of the characters is random but aligned in relationship to a common lead reference.

4. A multi-column photocomposition machine, comprising:

a photocomposition system including a font of characters and projection means for projecting characters of said font in column lines;

a power-driven paper feed means for advancing a photosensitive sheet along a path defining the image plane of said photocomposition system;

means for producing and thereafter detecting an established reference feature of a paper sheet advancing along said path and for producing a control signal when such feature is detected.

a controller for said machine, said controller providing advance feed of paper until a control signal is recorded, and thereafter providing multiple lines of composition in a column by repeating character-by-character exposure and line-by-line leading advance of said paper feed means;

whereby, the paper may be retracted and re-advanced repeatedly to be again detected and establish a new column starting line in alignment with a previous line.

5. The method of claim 1, wherein a photosensitive sheet is provided with preformed features which are detectable to establish a reverse and new advance leading.

6. The method of claim 1, wherein a photosensitive sheet is provided with a series of features for counting and leading control.

7. The method of claim 1, wherein the reference feature is the lead edge of the paper.

*8. A method of irregular baseline composition, comprising the steps of:*

*providing a means for detecting a reference feature of a sheet-web advancing along a path and for producing a control signal from such reference feature when detected;*

*providing a power-driven, sheet-web feed means for advancing a photosensitive sheet-web along said path;*

*advancing a sheet-web along said path until the reference feature thereof is detected by said feed means, and a control signal is generated;*

*applying said signal to stop said feed means;*

*composing characters to produce at least one character on a first column baseline;*

*thereafter reversing said feed means to withdraw the sheet-web to a position retracted from said means for detecting the desired reference feature;*

*re-advancing said sheet-web until another control signal is produced by said means for detecting the reference feature, and;*

*finally, stepping said feed means a leading distance equal to the distance of said first column baseline from said reference feature and further adjusted by a fractional leading distance to produce subscript and superscript insert positions off the baseline of said composed one character;*

*whereby an irregular baseline composition is obtained in registration from a common reference.*

*9. An irregular baseline photocomposition machine, comprising:*

*a photocomposition system including a font of characters and projection means for projecting characters of said font in column lines;*

*a power-driven, sheet-web feed means for advancing a photosensitive sheet-web along a path defining the image plane of said photocomposition system;*

*means for detecting an established reference feature of a sheet-web advancing along said path and for producing a control signal when such feature is detected;*

*a controller for said machine, said controller providing advance feed of the sheet-web until a control signal is recorded, and thereafter providing multiple lines of composition in a column by repeating character-by-character exposure and line-by-line leading advance of said feed means; and*

*said controller also providing for reverse of said feed means to retract said reference feature to a position prior to said means for detecting the feature and readvancing the sheet-web relative to the new detection to a desired leading offset above or below the baseline of the characters previously set;*

*whereby, the sheet-web may be retracted and readvanced repeatedly to again detect the reference feature and establish a new baseline in accurate reference to the reference feature.*

* * * * *